United States Patent
Hibara et al.

(10) Patent No.: US 9,779,275 B2
(45) Date of Patent: Oct. 3, 2017

(54) CONTROL SYSTEM, TERMINAL, INFORMATION SETTING METHOD, AND PROGRAM

(71) Applicant: Mitsubishi Electric Corporation, Tokyo (JP)

(72) Inventors: Naoyuki Hibara, Tokyo (JP); Takeru Kuroiwa, Tokyo (JP); Shinji Nakamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/124,052

(22) PCT Filed: Jul. 3, 2014

(86) PCT No.: PCT/JP2014/067823
§ 371 (c)(1),
(2) Date: Sep. 7, 2016

(87) PCT Pub. No.: WO2016/002050
PCT Pub. Date: Jan. 7, 2016

(65) Prior Publication Data
US 2017/0017821 A1    Jan. 19, 2017

(51) Int. Cl.
*G06F 17/00* (2006.01)
*G06K 7/14* (2006.01)
(Continued)

(52) U.S. Cl.
CPC ......... *G06K 7/1417* (2013.01); *G05B 19/128* (2013.01); *G06K 7/10722* (2013.01);
(Continued)

(58) Field of Classification Search
CPC .......... G06F 17/00; G06K 19/00; G06K 9/18; G06K 7/10; G06K 9/36; G06K 9/80
(Continued)

(56) References Cited

U.S. PATENT DOCUMENTS

2007/0043811 A1* 2/2007 Kim ................ G06Q 10/06
                                              709/203
2009/0138313 A1* 5/2009 Morgan ............ G06Q 10/06
                                              705/7.23
(Continued)

FOREIGN PATENT DOCUMENTS

| EP | 2 535 655 A1 | 12/2012 |
|---|---|---|
| JP | H05-030110 A | 2/1993 |
| JP | 2002-063294 A | 2/2002 |
| JP | 2006-340060 A | 12/2006 |
| JP | 2010-237790 A | 10/2010 |
| JP | 2012-156836 A | 8/2012 |
| JP | 2013-125330 A | 6/2013 |

(Continued)

OTHER PUBLICATIONS

International Search Report of the International Searching Authority mailed Sep. 2, 2014 for the corresponding International application No. PCT/JP2014/067823 (and English translation).

(Continued)

*Primary Examiner* — Edwyn Labaze
(74) *Attorney, Agent, or Firm* — Posz Law Group, PLC

(57) ABSTRACT

A control system is provided with: a control device that controls facility equipment on the basis of previously set control information; and a terminal that communicates with the control device. The terminal has: an image capturer that captures an image; an analyzer that acquires setting-support information for setting the control information in the control device by analyzing the image captured by means of the image capturer; and a transmitter that transmits to the control device the setting-support information acquired by means of the analyzer. The control device has: a receiver that receives the setting-support information transmitted from the transmitter; and a setter that sets the control information on the basis of the setting-support information received by means of the receiver.

6 Claims, 14 Drawing Sheets

(51) Int. Cl.
   *G06Q 50/16* (2012.01)
   *G05B 19/12* (2006.01)
   *G06K 7/10* (2006.01)
   *H04N 5/225* (2006.01)

(52) U.S. Cl.
   CPC ............. *G06Q 50/16* (2013.01); *H04N 5/225* (2013.01); *G05B 2219/23363* (2013.01)

(58) Field of Classification Search
   USPC .................... 235/375, 487, 462.09, 462.1
   See application file for complete search history.

(56) References Cited

U.S. PATENT DOCUMENTS

| | | |
|---|---|---|
| 2013/0131872 A1 | 5/2013 | Kuroiwa et al. |
| 2014/0061293 A1* | 3/2014 | Jayaprakash ..... G06F 17/30879 235/375 |
| 2016/0035246 A1* | 2/2016 | Curtis .................... H04L 67/10 434/219 |

FOREIGN PATENT DOCUMENTS

| | | |
|---|---|---|
| WO | 2011/099346 A1 | 8/2011 |
| WO | 2012/035789 A1 | 3/2012 |

OTHER PUBLICATIONS

Office Action dated Jun. 6, 2017 issued in corresponding JP Patent Application No. 2016-530767 (and partial English translation).

\* cited by examiner

FIG.2

| EQUIPMENT IDENTIFICATION INFORMATION | | ATTRIBUTE INFORMATION | | | | | |
|---|---|---|---|---|---|---|---|
| EQUIPMENT ID | ADDRESS | MODEL NAME | LABEL | GROUP | FLOOR NAME | POSITION | ... |
| 041 | aaa | XXX | CONFERENCE ROOM 1 | — | FLOOR 3 | (x1, y1) | ... |
| 042 | bbb | XXX | HALL | — | FLOOR 3 | (x2, y2) | ... |
| ⋮ | ⋮ | ⋮ | ⋮ | ⋮ | ⋮ | ⋮ | ⋮ |
| 050 | ccc | YYY | HALL | G1 | FLOOR 3 | (x3, y3) | ... |

CONTROL SYSTEM, TERMINAL, INFORMATION SETTING METHOD, AND PROGRAM

CROSS REFERENCE TO RELATED APPLICATION

This application is a U.S. national stage application of International Patent Application No. PCT/JP2014/067823 filed on Jul. 3, 2014, the disclosure of which is incorporated herein by reference.

TECHNICAL FIELD

The present disclosure is related to a control system, a terminal, an information setting method and a program.

BACKGROUND ART

When facility equipment such as air conditioners, lighting equipment and/or the like is installed in a structure such as a building and/or the like, there are cases in which a control device for controlling this facility equipment is installed. The control device is a device that controls the facility equipment in accordance with user input and/or the like. Consequently, a user can manipulate the facility equipment via the control device.

In order to support manipulation of the facility equipment by the user, some control devices display the locations where the facility equipment that is the subject of manipulation is installed, through names appended in advance to those locations, a layout diagram and/or the like. In addition, groups of facility equipment that operate in conjunction with each other are set in advance in the control device, and through this bulk manipulation of a plurality of pieces of facility equipment becomes possible (for example, see Patent Literature 1).

CITATION LIST

Patent Literature

Patent Literature 1: International Publication No. WO 2011/099346

SUMMARY OF INVENTION

Technical Problem

In order for the control device to control the facility equipment, typically various control information with which the control device controls the facility equipment must be set in the control device in advance. For example, when the control device controls a plurality of pieces of facility equipment, typically pre-setting information for discriminating each of the various pieces of facility equipment is necessary. When the control device displays the locations where the pieces of facility equipment that are the subject of manipulation are installed, typically pre-setting names appended in advance to those locations, layout diagrams and/or the like is necessary. When the user manipulates a plurality of pieces of facility equipment all together, typically pre-setting a group of facility equipment with linked operation is necessary.

This kind of control information setting was conventionally done through a manual input by a worker and/or the like who installed the control device or the facility equipment, while viewing materials prepared in advance. However, this kind of setting work was complex.

In consideration of the foregoing, an objective of the present disclosure is to make setting of control information for controlling facility equipment easy in a control device.

Solution to Problem

In order to achieve the above objective, a control system according to the present disclosure comprises a control device configured to control facility equipment based on control information that is pre-set, and a terminal configured to communicate with the control device. The terminal comprises an image capturer configured to capture an image, an analyzer configured to analyze the image captured by the image capturer to acquire setting-support information for setting the control information in the control device, and a transmitter configured to transmit the setting-support information acquired by the analyzer to the control device. The control device comprises a receiver configured to receive the setting-support information transmitted from the transmitter, and a setter configured to set the control information based on the setting-support information received by the receiver.

Advantageous Effects of Invention

Through the present disclosure, a terminal, by analyzing a captured image, acquires setting-support information for setting control information in the control device, and transmits the acquired setting-support information to the control device. Through this, control information is set in the control device on the basis of the setting-support information. Consequently, a worker and/or the like can set control information by capturing an image. Accordingly, easily setting control information in the control device becomes possible.

BRIEF DESCRIPTION OF DRAWINGS

FIG. 2 is a drawing showing one example of control information according to the exemplary embodiment;

DESCRIPTION OF EMBODIMENTS

Exemplary Embodiment

Figure 1:
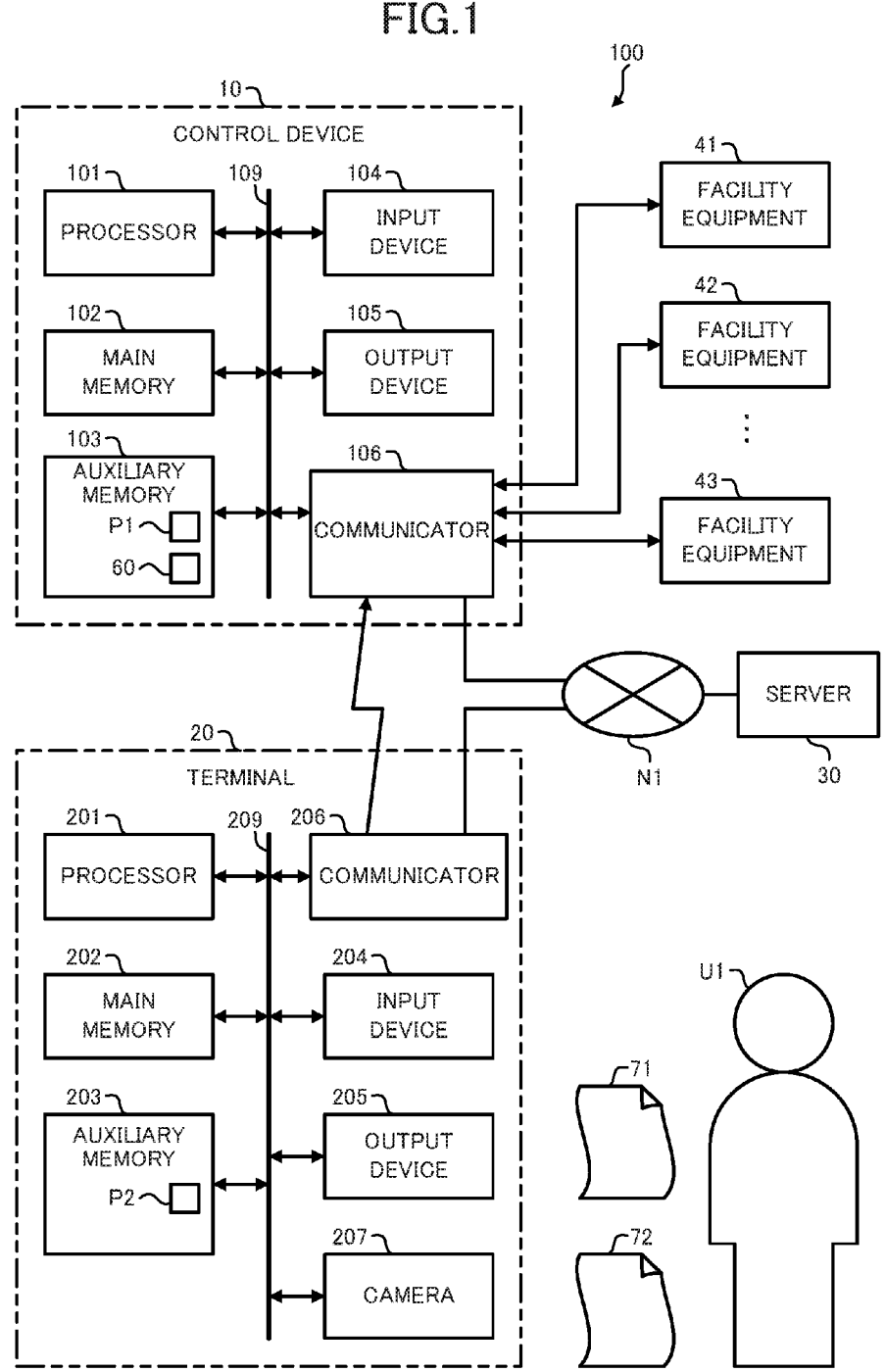
FIG. 1 is a drawing showing an exemplary configuration of a control system according to an exemplary embodiment of the present disclosure.

A control system 100 according to this exemplary embodiment is a system for controlling a plurality of pieces of facility equipment 41, 42, . . . , 43 installed in an establishment such as a building and/or the like, for example, as shown in FIG. 1. As shown in this drawing, the control system 100 comprises a control device 10 for controlling the facility equipment 41-43 on the basis of pre-set control information 60, a terminal 20 for setting the control information 60 in the control device 10, and a server 30 connected to the control device 10 and the terminal 20 via a network N1.

Each of the pieces of facility equipment 41-43 is, for example, air conditioning equipment installed on a different floor, section and/or the like of the establishment. Each of the pieces of facility equipment 41-43 is for example connected so as to be capable of communicating with the control device 10 via a local area network (LAN) that is wired, wireless or a combination of wired and wireless. Each of the pieces of facility equipment 41-43 receives packets including control commands in the payload from the control device 10. Each of the pieces of facility equipment 41-43 conditions the air in a predetermined target space for example by blowing flowing conditioned air at a temperature indicated by the received control command in a volume indicated by the received control command. The facility equipment 41-43 is not limited to air conditioners, and for example may be lighting equipment, ventilation devices, elevators or surveillance cameras.

The control device 10 is, for example, a computer installed in a management room for managing the facility equipment 41-43. The control information 60 is set in advance in the control device 10. For example, a user (a manager) of the control device 10 can do input manipulations using a user interface on the basis of the pre-set control information 60. The control device 10 controls the facility equipment 41-43 on the basis of the manipulation contents input by the user, the pre-set control information 60 and/or the like.

An example of the control information 60 set in the control device 10 is shown in FIG. 2. As shown in this drawing, in the control information 60, equipment identification information for identifying each of the pieces of facility equipment 41-43 and attribute information indicating attributes of each of the pieces of facility equipment 41-43 are associated with each other.

The equipment identification information includes equipment identification data (ID) indicating a unique number assigned to each of the pieces of facility equipment 41-43, and an address for each of the pieces of facility equipment 41-43 used in communications between the facility equipment 41-43 and the control device 10. In the example shown in this drawing, the equipment IDs of the facility equipment 41-43 are respectively "041", "042" and "050". In addition, the addresses of the facility equipment 41-43 are, for example, IP addresses used by the LAN for the facility equipment 41-43 and the control device 10 to communicate, and in the example shown in the drawing, are respectively "aaa", "bbb" and "ccc".

The attribute information includes a model name (a model number), a label, a group, a floor name and position information, for each of the pieces of facility equipment 41-43.

The label is information appropriately appended to each of the pieces of facility equipment 41-43, and in this exemplary embodiment, is information for specifying a room as the location (region) where the facility equipment 41-43 is installed. In addition, the group is set when there is a group to which each of the pieces of facility equipment 41-43 belongs, and for example, is used in bulk manipulation of a plurality of pieces of equipment. When a group is designated by the user and manipulation contents are input, the control device 10 controls the facility equipment belonging to the designated group. The label and the group are typically determined in advance by a designer who designed the facility system comprising the control device 10 and the facility equipment 41-43.

The floor name is information for specifying a floor on which each of the pieces of facility equipment 41-43 is installed. The position information is X,Y coordinate values indicating the location of each of the pieces of facility equipment 41-43 on the floor on which each of the pieces of facility equipment 41-43 is installed. The coordinate values are for example values expressed in units of meters when a position equating to the lower left edge of a layout diagram, out of the design documents created by the contractor and/or the like, is taken as the origin (see FIG. 4). The floor name and position information are determined in advance by the contractor. The contractor is the contractor that constructed the establishment, and is often a different contractor from the designer that determined the label and the group.

Each of the pieces of facility equipment 41-43 retains as equipment information 61 the equipment's own address and model name, out of the control information 60. Consequently, the control device 10 can obtain the address and the model name of each of the pieces of facility equipment 41-43 by means of inquiries through communication to each of the facility equipment 41-43.

As described above, in this exemplary embodiment the control information 60 is a table that mutually associates two items of equipment identification information (equipment ID, address) and five items of attribute information (model name, label, group, floor name, position information), but may also be a table that associates at least two items of information. For example, the control information 60 may be a table that associates together one item of equipment identification information and one item of attribute information, or may be a table that mutually associates two items of attribute information. The control information 60 preferably includes at least one item of each of the equipment identification information and the attribute information, and through this enables bulk control of the facility equipment 41-43 having specific attributes. In addition, when the destination of a control command is determined by address, the control information 60 preferably includes an address.

As shown in FIG. 1, the control device 10 comprises a processor 101, a main memory 102, an auxiliary memory 103, an input device 104, an output device 105 and a communicator 106. The main memory 102, the auxiliary memory 103, the input device 104, the output device 105 and the communicator 106 are all connected to the processor 101 via an internal bus 109.

The processor 101 comprises, for example, a central processing unit (CPU) and/or the like. The processor 101 executes below-described processes by executing a program P1 stored in advance in the auxiliary memory 103. In addition, the main memory 102 comprises, for example, random access memory (RAM) and/or the like. The main memory 102 loads the program P1 from the auxiliary memory 103. In addition, the main memory 102 is used as a work area for the processor 101.

The auxiliary memory 103 includes non-volatile memory such as a hard disk, flash memory and/or the like. The auxiliary memory 103 stores various types of data used in processes of the processor 101, besides the program P1. The control information 60 is included in the data stored in the auxiliary memory 103. The auxiliary memory 103 supplies data for use by the processor 101 to the processor 101 and stores data supplied from the processor 101 in accordance with instructions from the processor 101.

The input device 104 comprises, for example, input keys, an electrostatic capacitance-type pointing device and/or the like. The input device 104 acquires information input by a user of the control device 10 and communicates the acquired information to the processor 101. The output device 105 comprises, for example, a liquid crystal display (LCD), a speaker and/or the like. The output device 105 exhibits various types of information to the user by displaying a screen or reproducing sound in accordance with instructions from the processor 101. The input device 104 and the output device 105 according to this exemplary embodiment are integrally formed and constitute a touch screen.

The communicator 106 comprises, for example, a LAN interface and/or the like. The communicator 106 generates packets including data output from the processor 101, and sends the packets to the terminal 20, the facility equipment 41-43 or the server 30. In addition, the communicator 106 extracts data included in packets received from the terminal 20, the facility equipment 41-43 or the server 30, and outputs this data to the processor 101.

Figure 3:
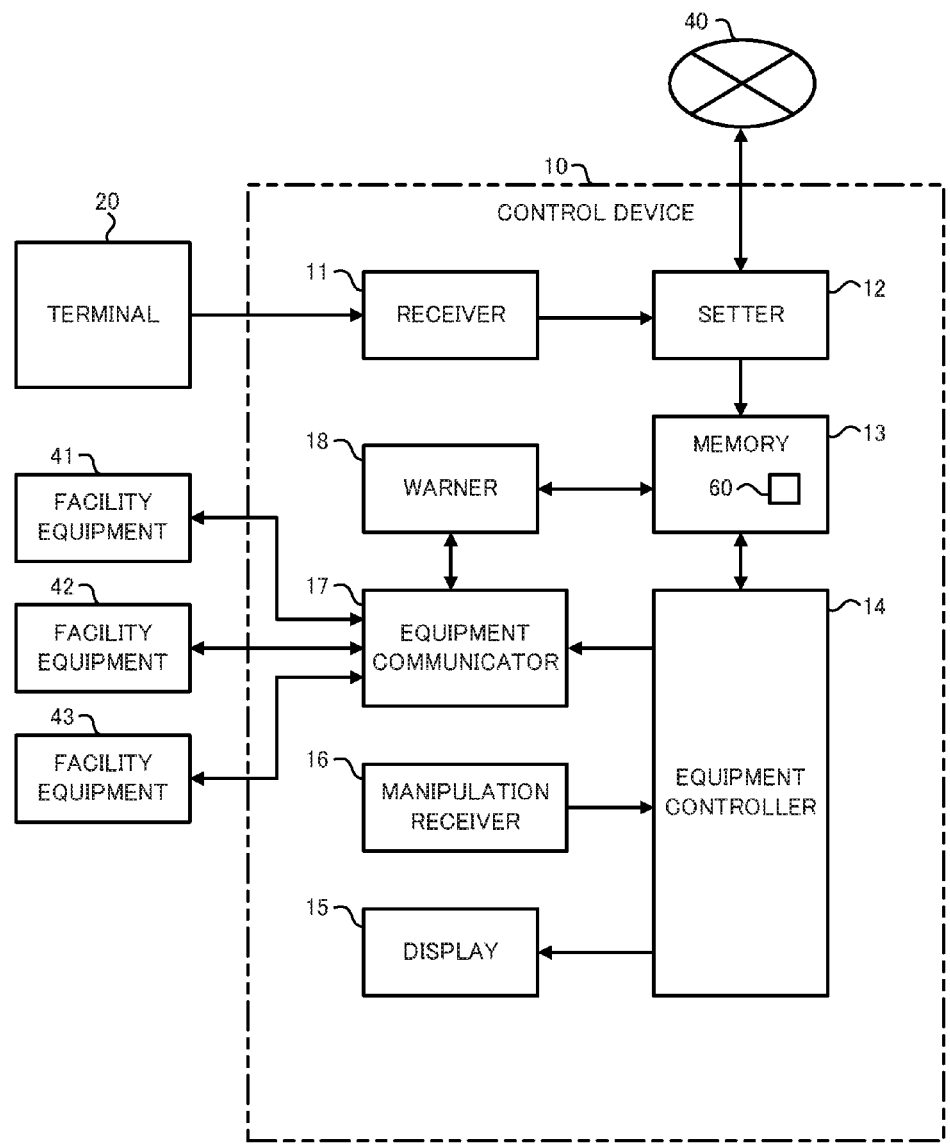
FIG. 3 is a drawing showing an exemplary configuration of a control device according to the exemplary embodiment.

The control device 10 exhibits various functions as a result of having the above-described configuration. A functional configuration of the control device 10 is shown in FIG. 3. As shown in this drawing, the control device 10 contains a receiver 11 for receiving data from the terminal 20, a setter 12 for setting the control information 60, a memory 13 for storing the control information 60, an equipment controller 14 for controlling the facility equipment 41-43 on the basis of the control information 60, a display 15 for displaying a manipulation screen for manipulating the facility equipment 41-43, a manipulation receiver 16 for receiving manipulation contents input by the user, an equipment communicator 17 for communicating with the facility equipment 41-43, and a warner 18 for warning the user when there is invalid data.

The receiver 11 receives from the terminal 20 setting-support information for setting the control information 60. There are cases in which the control information 60 is included and cases in which the control information 60 is not included in this setting-support information, and details are discussed below. The receiver 11 is realized by the communicator 106.

The setter 12 sets the control information 60 on the basis of the setting-support information received by the receiver 11. To be more detailed, for example when the setting-support information received by the receiver 11 includes the control information 60, the setter 12 stores the control information 60 in the memory 13.

In addition, for example when the setting-support information received by the receiver 11 includes the address of the server 30, the setter 12 acquires the control information 60 from the server 30 via a network 40, and sets the acquired control information 60. Instead of setting the control information 60 once, the setter 12, after setting a portion of the control information 60, may supplement the control information 60 or may reset the control information 60. Setting the control information 60 means storing the control information 60 in the memory 13. The setter 12 is realized through cooperating between the processor 101 and the communicator 106.

The memory 13 stores the control information 60 that is set. The memory 13 supplies the control information 60 to the equipment controller 14 or the warner 18, in response to requests from the equipment controller 14 or the warner 18. The memory 13 is realized by the auxiliary memory 103.

The equipment controller 14 generates and outputs to the display 15 screen data for displaying a manipulation screen, on the basis of the control information 60. In addition, the equipment controller 14 determines the control contents and the facility equipment that is the control target, in accordance with manipulation contents input by the user. Furthermore, the equipment controller 14 outputs to the equipment communicator 17 the address of the facility equipment that is the control target and a control command indicating control contents, on the basis of the control information 60. The control contents indicated by the control command are, for example, instructions to set the operation mode to "cooling", set the temperature to "26° C." and set the air volume to "strong". The equipment controller 14 is realized by the processor 101.

The display 15 acquires screen data from the equipment controller 14 and displays the manipulation screen. The display 15 is realized by the output device 105. In addition, the manipulation receiver 16 receives the manipulation contents input from the user and communicates the received manipulation contents to the equipment controller 14. The manipulation receiver 16 is realized by the input device 104.

The equipment communicator 17 stores the address output from the equipment controller 14 in a header of a packet, and also stores the control command in a payload of the packet and then sends this packet. In addition, the equipment communicator 17 acquires the equipment information 61 (address, model name) through communication with the facility equipment 41-43, in response to requests from the warner 18, and outputs the acquired equipment information 61 to the warner 18. The equipment communicator 17 is realized by the communicator 106.

The warner 18 produces a warning when the equipment information 61 acquired from the equipment communicator 17 and the address and the model name out of the control information 60 stored in the memory 13 differ. The warning may be produced for example by a buzzer sound or LED light, or may be the display of a screen promoting caution to the user. The warner 18 is realized through cooperation between the processor 101 and the output device 105.

Returning to FIG. 1, the terminal 20 is for example a tablet terminal carried by a worker U1, and communicates with the control device 10 via a LAN.

The worker U1 is typically a worker who installs the facility equipment 41-43 and the control device 10, and is often a worker differing from both the designer that determined the labels and/or the like and the contractor that determined the position information of the facility equipment 41-43. The worker U1 carries design materials 71 created by the contractor and design materials 72 created by the designer, and sets the control information 60 in the control device 10 using the terminal 20. The design materials 71 are documents indicating the floor name and position information determined by the contractor. The design materials 72 are documents indicating the label and the group determined by the designer.

Figure 4:
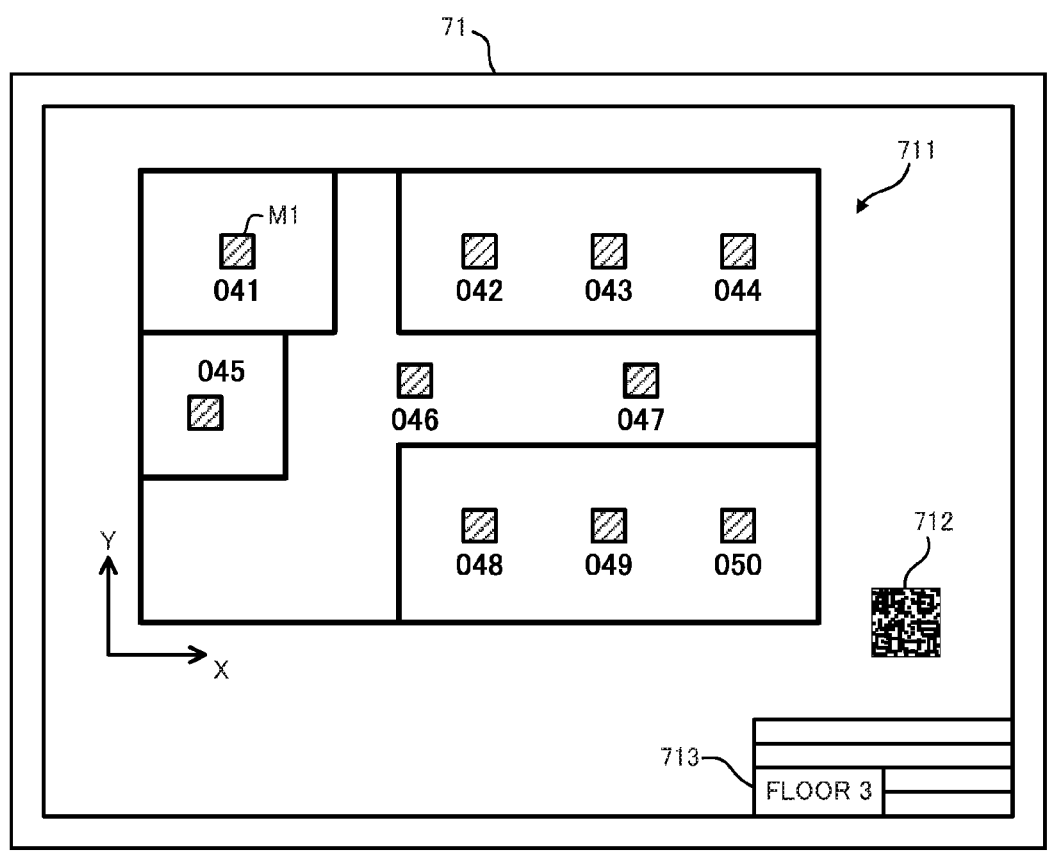
FIG. 4 is a drawing showing a first example of design materials according to the exemplary embodiment.

As shown in the example of FIG. 4, a layout diagram 711 created by the contractor, a two-dimensional code 712 and a box 713 indicating the floor name are printed on the design materials 71.

In the layout diagram 711, the position of each of the pieces of facility equipment 41-43 is shown along with the equipment ID of each of the pieces of facility equipment 41-43. That is to say, the layout diagram 711 shows the control information 60 in which the equipment identification information (equipment ID) and attribute information (position information) are linked to each other. For example, surrounding a mark M1 expressing the facility equipment 41, the equipment ID "041" of the facility equipment 41 is recorded, and through this the position of the facility equipment 41 is indicated.

The two-dimensional code 712 includes the control information 60 indicated by the layout diagram 711, or server identification information for identifying the server 30. In particular, for example the two-dimensional code 712 including the control information 60 is encoded from the control information 60 by the contractor and printed on the design materials 71. The method of indicating the two-dimensional code 712 is not limited to printing, and for example a seal on which the two-dimensional code 712 is printed may be sealed or affixed to the design materials 71.

In addition, for example the server identification information is a uniform resource identifier (URI), and the two-dimensional code 712 including this server identification information indicates the whereabouts of the control information 60. The server 30 stores the control information 60 as described below, so the control device 10 or the terminal 20 can, by reading the server identification information from the two-dimensional code 712, communicate with the server 30 and acquire the control information 60 from the server 30.

The two-dimensional code 712 may not be shown in the design materials 71. When the two-dimensional code 712 is not shown in the design materials 71, the design materials 71 for example show only the layout diagram 711 and the box 713.

Figure 5:
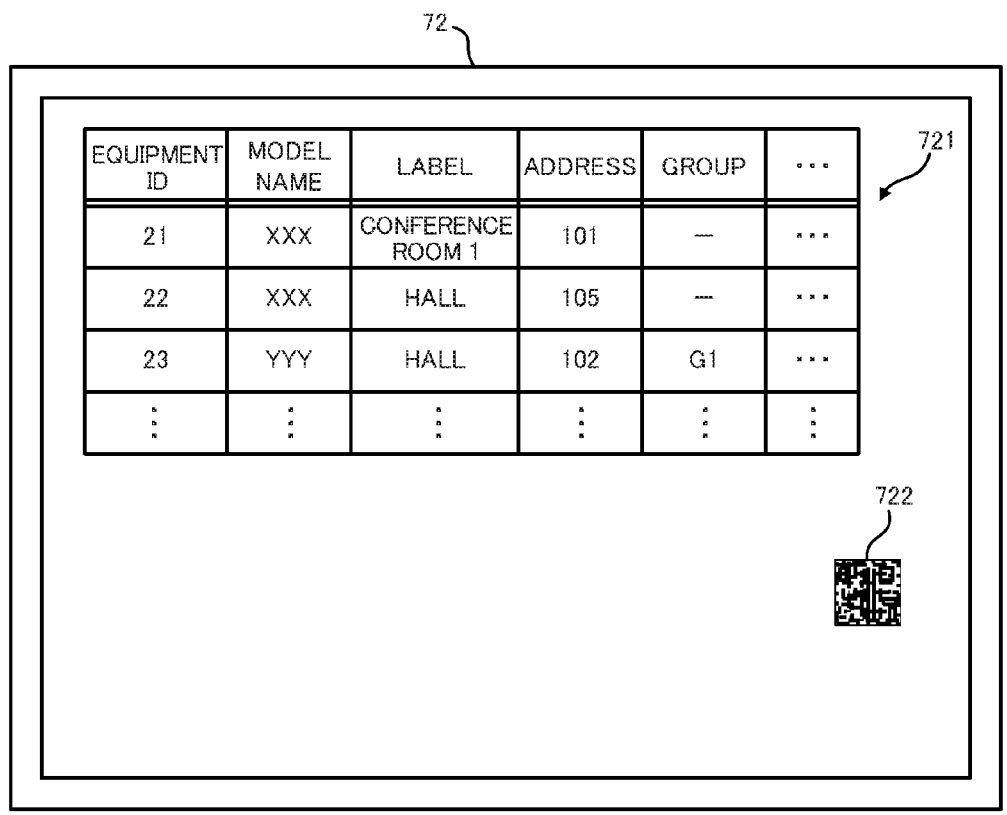
FIG. 5 is a drawing showing a second example of the design materials according to the exemplary embodiment.

As shown in FIG. 5, a table 721 including the labels and the groups determined by the designer, and a two-dimensional code 722 are printed on the design materials 72. The table 721, an example of which is shown in this drawing, includes the equipment ID, the model name and the address, in addition to the label and the group. That is to say, the table 721 shows the control information 60 in which two items of equipment identification information (equipment ID, address) and three items of attribute information (model name, label, group) are associated with each other.

The two-dimensional code 722 includes the control information 60 shown by the table 721, or the server identification information. The two-dimensional code 722 is for example encoded from the control information 60 by the designer, and printed on the design materials 72. The method of indicating the two-dimensional code 722 is not limited to printing, and for example a seal on which the two-dimensional code 722 is printed may be sealed or affixed to the design materials 72.

As shown in FIG. 1, the terminal 20 comprises a processor 201, a main memory 202, an auxiliary memory 203, an input device 204, an output device 205, a communicator 206 and a camera 207. The main memory 202, the auxiliary memory 203, the input device 204, the output device 205, the communicator 206 and the camera 207 are each connected to the processor 201 via an internal bus 209.

The processor 201 comprises, for example, a CPU and/or the like. The processor 201 executes below-described processes by executing a program P2 stored in the auxiliary memory 203. In addition, the main memory 202 comprises, for example, random access memory (RAM) and/or the like. The main memory 202 loads the program P2 from the auxiliary memory 203. In addition, the main memory 202 is used as a work area for the processor 201.

The auxiliary memory 203 includes non-volatile memory such as a hard disk, flash memory and/or the like. The auxiliary memory 203 stores various types of data used in processes of the processor 201, besides the program P2. Images captured by the camera 207 are included in the data stored in the auxiliary memory 203. The auxiliary memory 203 supplies data for use by the processor 201 to the processor 201 and stores data supplied from the processor 201 in accordance with instructions from the processor 201.

The input device 204 comprises, for example, input keys, an electrostatic capacitance-type pointing device and/or the like. The input device 204 acquires information input by the worker U1 and communicates the acquired information to the processor 201. In addition, the output device 205 comprises, for example, an LCD, a speaker and/or the like. The output device 205 exhibits various types of information to the worker U1 by displaying a screen or reproducing sound in accordance with instructions from the processor 201. The input device 204 and the output device 205 according to this exemplary embodiment are integrally formed and constitute a touch screen.

The communicator 206 comprises, for example, a LAN interface and/or the like. The communicator 206 generates packets including data output from the processor 201, and sends the packets to the control device 10 or the server 30. In addition, the communicator 206 extracts data included in packets received from the controller 10 or the server 30, and outputs this data to the processor 201.

The camera 207 comprises, for example, a charge-coupled device (CCD) imaging element, a lens and/or the like. The camera 207 captures images in accordance with instructions from the processor 201, and outputs the captured images to the processor 201.

Figure 6:
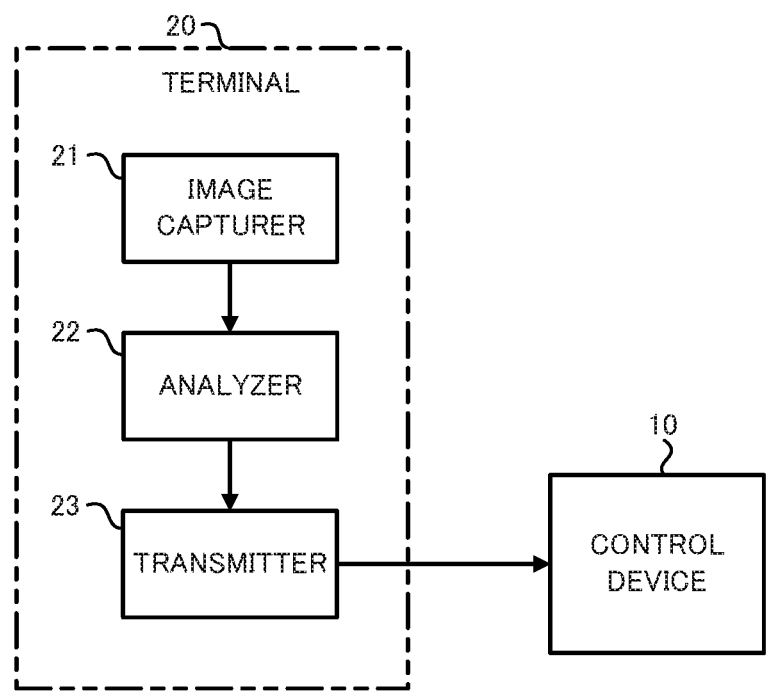
FIG. 6 is a drawing showing an exemplary configuration of a terminal according to the exemplary embodiment.

By having the above-described configuration, the terminal 20 exhibits various functions. A functional configuration of the terminal 20 is shown in FIG. 6. As shown in this drawing, the terminal 20 includes an image capturer 21 that captures images, an analyzer 22 that acquires setting-support information through analysis of captured images, and a transmitter 23 for transmitting the setting-support information to the control device 10.

The image capturer 21 captures images of the design materials 71 and 72 when the worker U1 points the lens of the camera 207 at the design materials 71 and 72 and presses an image-capture button. The image capturer 21 is realized by the camera 207.

The analyzer 22 reads the two-dimensional code 712 or 722 or the layout diagram 711 from the image of the design materials 71 or 72, and by analyzing the two-dimensional code 712, 722 or the layout diagram 711 that was read, acquires, as setting-support information, the control information 60 or the server identification information. The analyzer 22 is realized by the processor 201.

The transmitter 23 transmits the setting-support information acquired by the analyzer 22 to the control device 10 via wireless communication. The transmitter 23 is realized by the communicator 206.

The server 30 is for example a Web server device, as shown in FIG. 1. The server 30 stores the control information 60 registered in advance by the contractor or the designer. The control information 60 registered in the server 30 typically includes the same content as the control information 60 indicated by the design materials 71 and 72. The server 30 supplies the stored control information 60 to equipment that accessed the server 30 using the server identification information. The server 30 may authenticate the equipment that accessed the server 30 and supply the control information 60 when conditions are satisfied. For example, the server 30 may accomplish password authentication.

Next, processes executed by the terminal 20 and the control device 10 constituting the control system 100 are described in order with reference to FIGS. 7 to 13.

Figure 7:
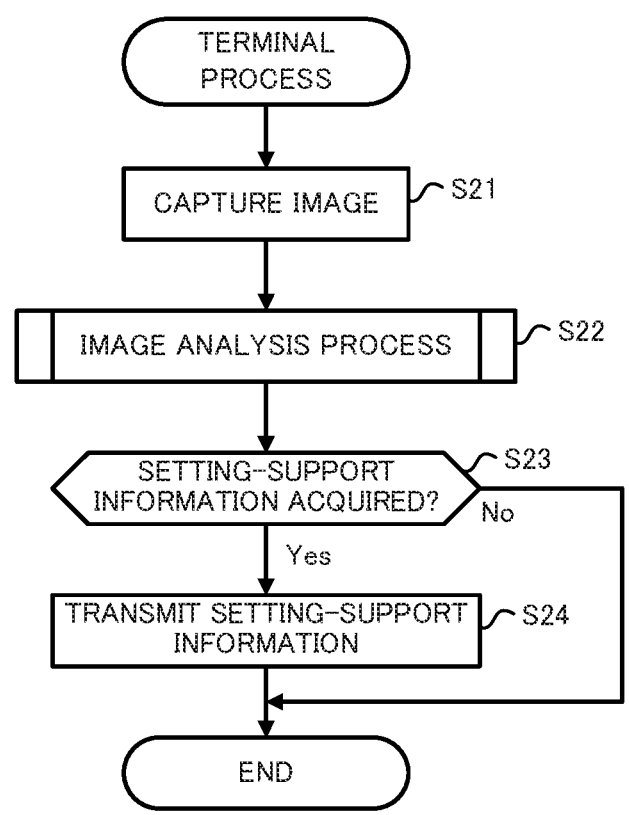
FIG. 7 is a flowchart showing one example of the flow of a terminal process according to the exemplary embodiment.

FIG. 7 shows a terminal process executed by the terminal 20. The terminal process is a process for setting the control information 60 in the control device 10, and is started by the worker U1 launching a specific application.

In the terminal process, the image capturer 21 captures an image in accordance with pressing of an image-capture button by the worker U1 (step S21). Through this, for example a five megapixel digital image is captured in a state with the focus adjusted by an autofocus function of the image capturer 21.

Figure 8:
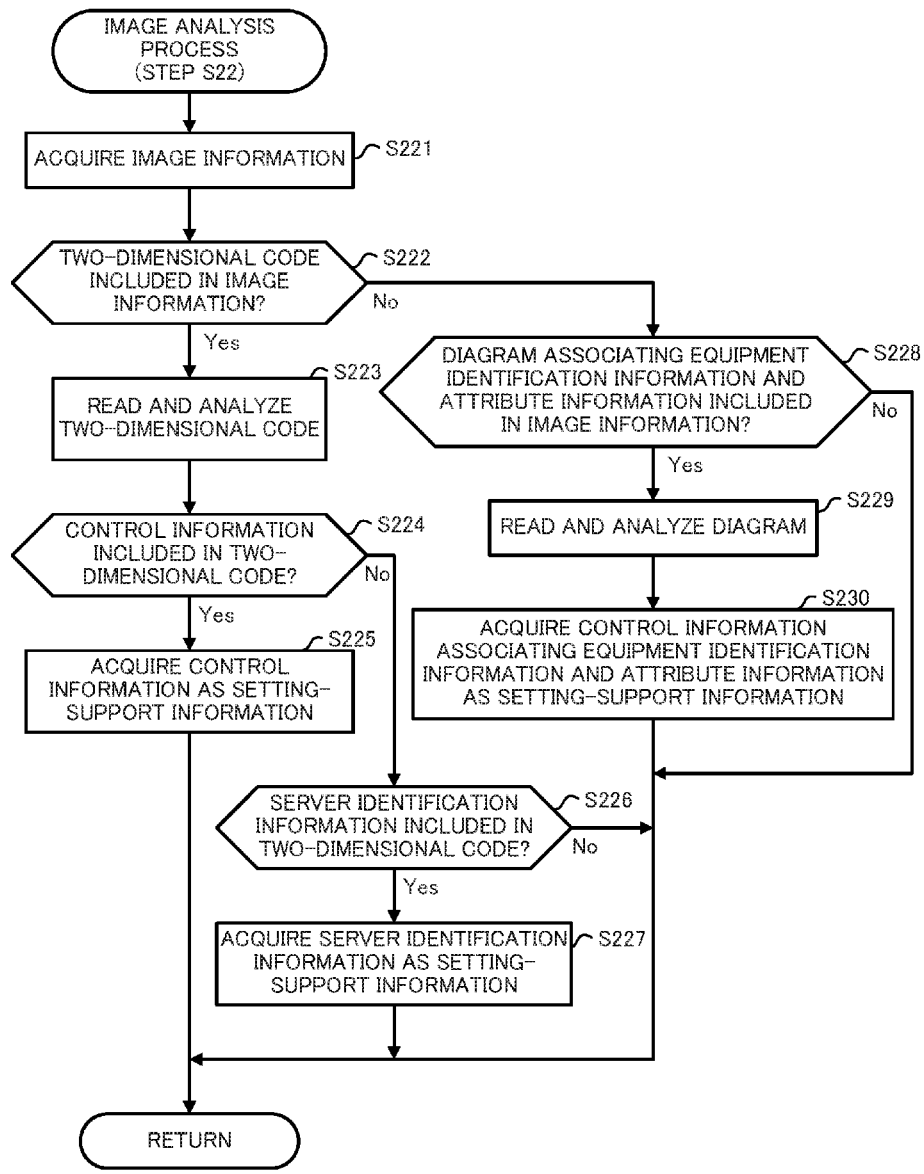
FIG. 8 is a flowchart showing one example of the flow of an image analysis process according to the exemplary embodiment.

The analyzer 22 executes an image analysis process (step S22). Details of the image analysis process are shown in FIG. 8.

As shown in this drawing, the analyzer 22 acquires image information indicating the image captured by the image capturer 21 (step S221). The image information is data indicating the image, and for example is digital data in Joint Photographic Experts Group (JPEG) format.

The analyzer 22 determines whether or not the two-dimensional code is included in the image information (step S222). For example, the analyzer 22 determines whether or not the two-dimensional code is included in the image information by searching for the two-dimensional code from the image through pattern matching.

When a determination is made that the two-dimensional code is included in the image information (step S222: Yes), the analyzer 22 reads and analyzes the two-dimensional code (step S223). For example, the analyzer 22 decodes the two-dimensional code, removing noise overlaying the two-dimensional code.

The analyzer 22 determines whether or not the control information 60 is included in the two-dimensional code (step S224). For example, the analyzer 22 determines whether or not data in a predetermined table format is included in the two-dimensional code. The analyzer 22 may also determine whether or not data indicating that the control information 60 is included in the two-dimensional code is included in the two-dimensional code along with the control information 60.

When a determination is made that the control information 60 is included in the two-dimensional code (step S224: Yes), the analyzer 22 acquires, as setting-support information, the control information 60 included in the two-dimensional code (step S225). Following this, the analyzer 22 concludes the image analysis process.

When a determination is made that the control information 60 is not included in the two-dimensional code (step S224: No), the analyzer 22 determines whether or not the server identification information is included in the two-dimensional code (step S226). For example, the analyzer 22 determines whether or not a URI (character string data) beginning with "http://" is included in the two-dimensional code.

When a determination is made that the server identification information is not included in the two-dimensional code (step S226: No), the analyzer 22 concludes the image analysis process without acquiring setting-support information.

When a determination is made that the server identification information is included in the two-dimensional code (step S226: Yes), the analyzer 22 acquires, as setting-support information, the server identification information included in the two-dimensional code (step S227). Following this, the analyzer 22 concludes the image analysis process.

When in step S222 a determination is made that the two-dimensional code is not included in the image information (step S222: No), the analyzer 22 determines whether or not a diagram linking equipment identification information and attribute information is included in the image information (step S228). For example, the analyzer 22 confirms to the worker U1 whether or not the layout diagram was captured, by causing a message "Was the layout diagram captured? Yes/No" to be displayed on the screen. The analyzer 22 determines whether or not a diagram linking the equipment identification information and the attribute information is included in the image information on the basis of manipulation by the worker U1 in response to the message. By pre-setting the format of the diagram, the analyzer 22 may also search for the diagram from the image information and determine whether or not the diagram is included in the image information.

When a determination is made that the diagram is not included in the image information (step S228: No), the analyzer 22 concludes the image analysis process without acquiring the setting-support information.

When a determination is made that the diagram is included in the image information (step S228: Yes), the analyzer 22 reads and analyzes the diagram (step S229). For example, the analyzer 22 recognizes through the image process lines indicating walls or partitions, marks painted over with squares indicating the facility equipment 41-43 and characters displayed as equipment IDs and floor names. Through this, the analyzer 22 extracts from the layout diagram the control information 60 associating the equipment IDs, the floor names and the position information. Furthermore, the analyzer 22 extracts from the layout diagram the arrangement and the shapes of walls or partitions.

The analyzer 22 acquires, as setting-support information, the control information 60 associating the equipment identification information and attribute information included in the diagram (step S230). Following this, the analyzer 22 concludes the image analysis process.

As shown in FIG. 7, after conclusion of the image analysis process (step S22), the analyzer 22 determines whether or not, as a result of the image analysis process (step S22), the setting-support information was acquired (step S23).

When a determination is made that the setting-support information was not acquired (step S23: No), the analyzer 22 concludes the terminal process without transmitting the setting-support information to the control device 10. When the terminal process has concluded, the worker U1 can repeat the setting work of the control information 60 by again executing the terminal process.

When a determination is made that the analyzer 22 acquired the setting-support information (step S23: Yes), the transmitter 23 transmits the setting-support information acquired by the analyzer 22 to the control device 10 (step S24). Following this, the terminal 20 concludes the terminal process.

Figure 9:
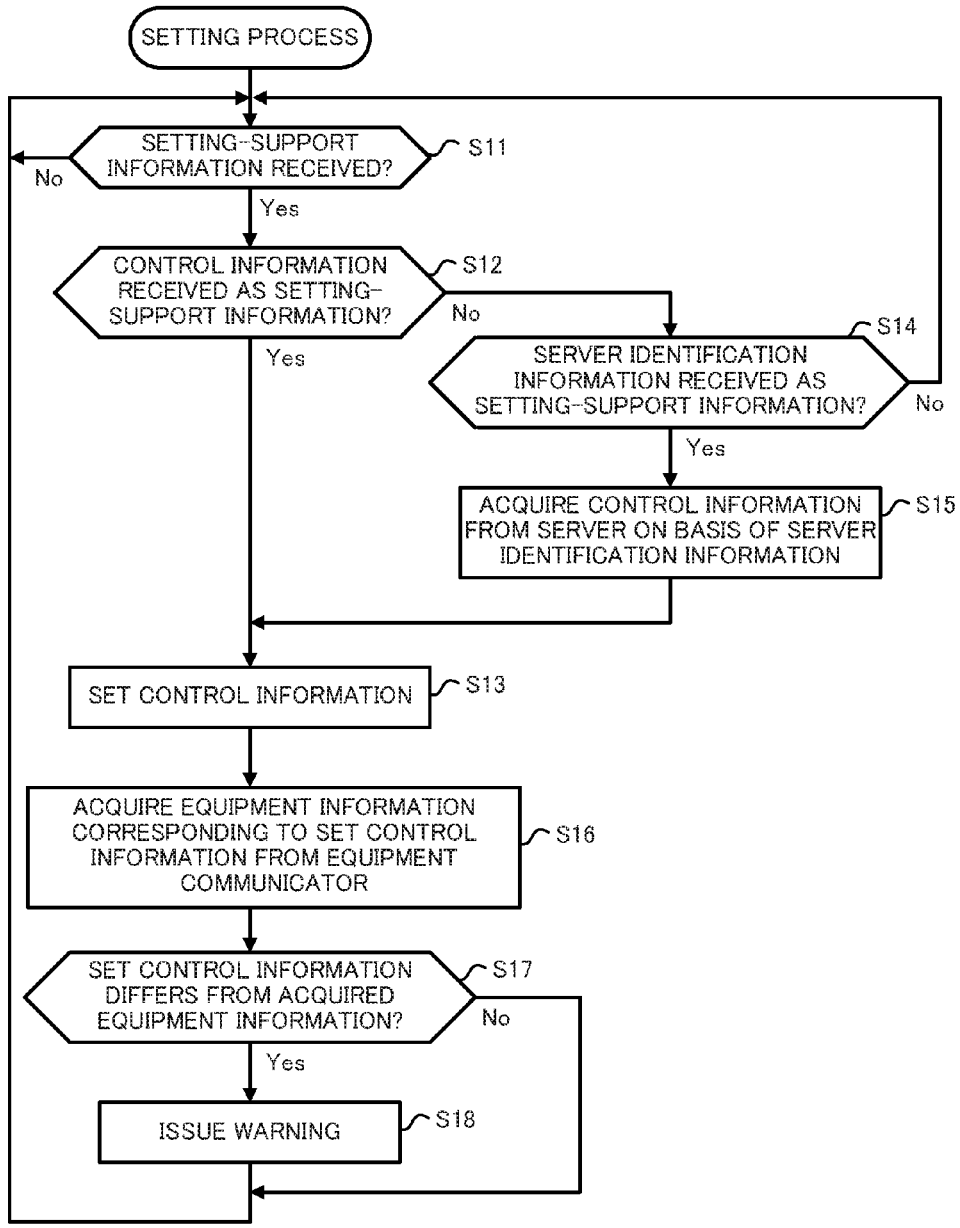
FIG. 9 is a flowchart showing one example of the flow of a setting process according to the exemplary embodiment.

FIG. 9 shows a setting process executed by the control device 10. The setting process is a process for setting the control information 60, and is started when the power source of the control device 10 is turned on.

The setter 12 determines whether or not the setting-support information was received from the terminal 20 via the receiver 11 (step S11). For example, the setter 12 determines whether or not the setting-support information was received on the basis of whether or not a packet including a transmitter address indicating the terminal 20 was received via the receiver 11.

When a determination is made that the setting-support information was not received (step S11: No), the setter 12 again executes step S11. Through this, the setter 12 waits for reception of the setting-support information.

When a determination is made that the setting-support information was received (step S11: Yes), the setter 12 determines whether or not the control information 60 was received as the setting-support information (step S12). For example, the setter 12 determines whether or not the control information 60 was received on the basis of whether or not the setting-support information is data in a predetermined table format.

When a determination is made that the control information 60 was received as the setting-support information (step S12: Yes), the setter 12 sets the control information 60 (step S13). Through this, the control information 60 is stored in the memory 13.

When a determination is made that the control information 60 was not received as the setting-support information (step S12: No), the setter 12 determines whether or not the server identification information was received as the setting-support information (step S14). For example, the setter 12 determines whether or not the server identification information was received by determining whether or not the setting-support information is character string data beginning with "http://".

When a determination is made that the server identification information was not received as the setting-support information (step S14: No), the control device 10 again executes step S11.

When a determination is made that the server identification information was received as the setting-support information (step S14: Yes), the setter 12 acquires the control information 60 from the server 30 on the basis of the server identification information (step S15). Then, the setter 12 sets the control information 60 that was acquired (step S13).

The warner 18 acquires from the equipment communicator 17 the equipment information 61 corresponding to the control information 60 that was set (step S16). For example, the warner 18 requests transmission of the equipment information 61 by the equipment communicator 17. The equipment communicator 17, upon receiving a request from the warner 18, inquires to the facility equipment 41-43 about addresses and model names, and notifies the warner 18 of the results of the inquiry.

The warner 18 determines whether or not the control information 60 that was set differs from the equipment information 61 acquired from the equipment communicator 17 (step S17). For example, the warner 18 determines whether or not the addresses and model names included in the control information 60, and the addresses and model names included in the equipment information 61, match. Specifically, when an address or model name not included in the control information 60 that was set is included in the equipment information 61, the warner 18 determines that the set control information 60 differs from the equipment information 61 acquired from the equipment communicator 17. In addition, when the combination of addresses and model names contained in the control information 60 and the combination of addresses and model names acquired from the equipment communicator 17 match, the warner 18 determines that the set control information 60 and the equipment information 61 acquired from the equipment communicator 17 do not differ.

When a determination is made that the set control information 60 does not differ from the equipment information 61 acquired from the equipment communicator 17 (step S17: No), the control device 10 again executes the process of step S11.

When a determination is made that the set control information 60 differs from the equipment information 61 acquired from the equipment communicator 17 (step S17: Yes), the warner 18 issues a warning (step S18). For example, the warner 18 displays results of comparing the addresses and model names included in the control information 60 and the equipment information 61 acquired from the equipment communicator 17. When the comparison results are displayed, data that does not match is preferably displayed with emphasis. Through this, the worker U1 can easily recognize that the set control information 60 and the equipment information 61 retained in the facility equipment 41-43 do not match.

Following this, the control device 10 again executes the process of step S11.

Figure 10:
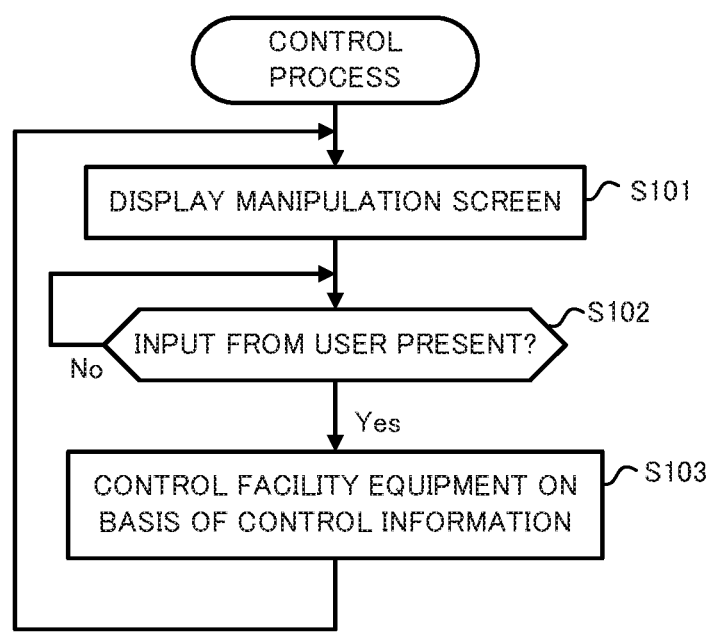
FIG. 10 is a flowchart showing one example of the flow of a control process according to the exemplary embodiment.

FIG. 10 shows a control process executed by the control device 10. The control process is a process for controlling the facility equipment 41-43, and is started when the power source of the control device 10 is turned on. This control process may be executed in parallel with the setting process shown in FIG. 9.

Figure 11:
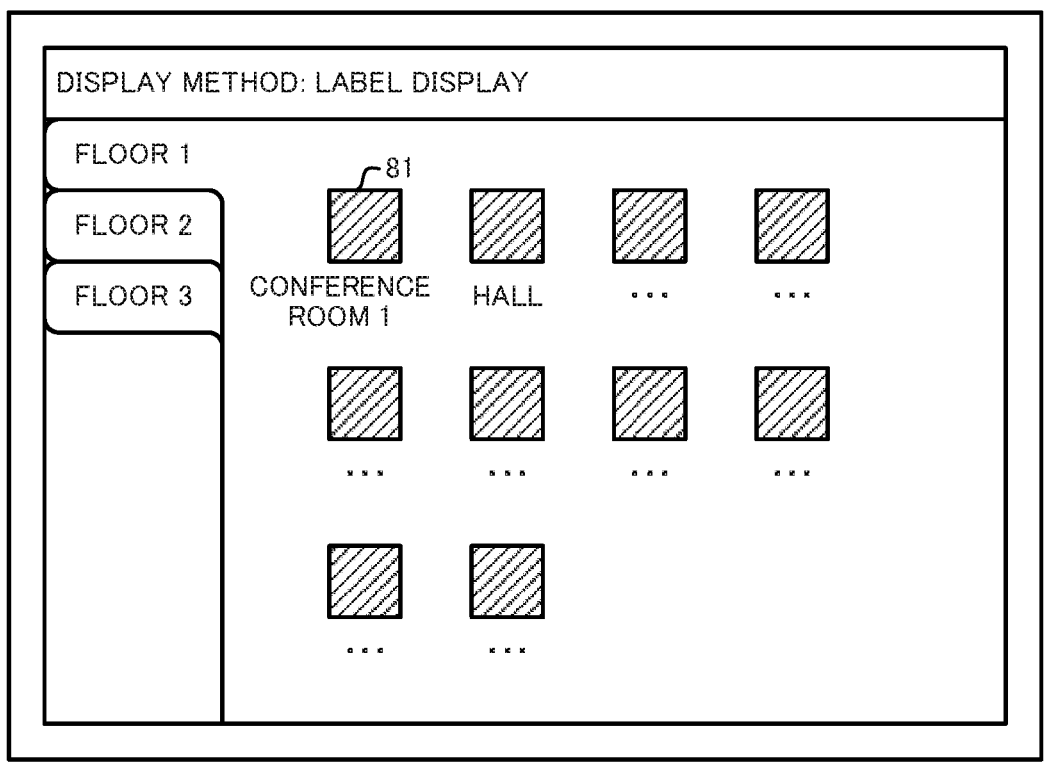
FIG. 11 is a drawing showing a first example of a manipulation screen according to the exemplary embodiment.

In the control process, the display 15 displays a manipulation screen (step S101). FIG. 11 shows an example of the manipulation screen displayed by the display 15. In the example in this drawing, an overview of labels attached to the facility equipment 41-43 for each floor on which the pieces of facility equipment 41-43 are installed is displayed. This manipulation screen is a screen that the equipment controller 14 generates on the basis of the floor names and the labels out of the control information 60.

Figure 12:
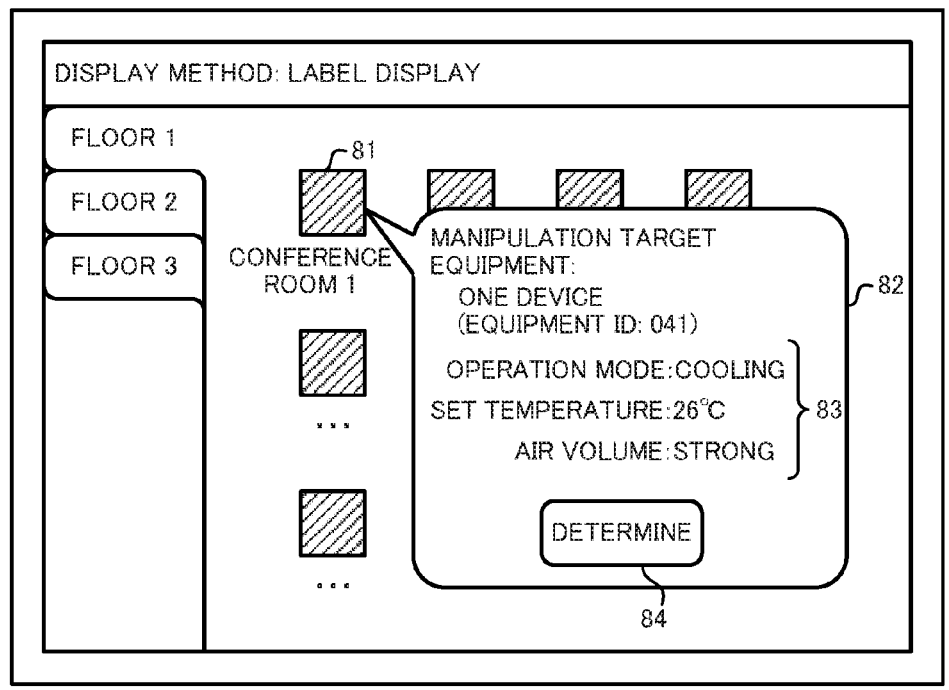
FIG. 12 is a drawing showing a second example of a manipulation screen according to the exemplary embodiment.

When the manipulation screen shown in this drawing is displayed, when the user touches an icon 81 displayed along with the character string "conference room 1", the display 15 displays a second example of a manipulation screen including a window 82, as shown in FIG. 12. This window 82 is used for manipulating the facility equipment to which the label "conference room 1" is appended. The window 82 is created by the equipment controller 14 after referencing the equipment IDs associated with the label "conference room 1", out of the control information 60. Consequently, the window 82 includes the equipment ID "041" of the facility equipment 41 (manipulation target equipment) to which the label "conference room 1" is attached.

In addition, the window 82 includes a region 83 for selecting manipulation contents, and a button 84 for determining manipulation contents. When the user touches the button 84, the manipulation contents for the manipulation target equipment are input into the control device 10.

Figure 13:
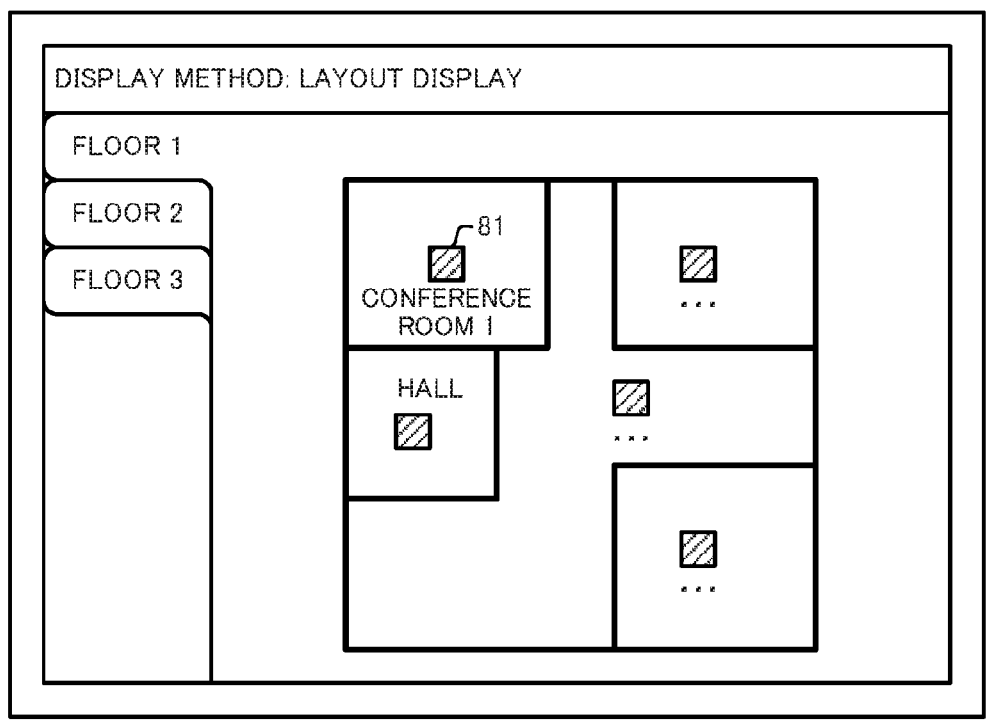
FIG. 13 is a drawing showing a third example of a manipulation screen according to the exemplary embodiment.

FIG. 13 shows a third example of a manipulation screen displayed by the display 15. In the example shown in this drawing, an icon group expressing labels is positioned, using the layout diagram 711 read out from the design materials 71. When the manipulation screen shown in this drawing is displayed, and the user touches the icon 81 expressing "conference room 1", the display 15 displays the same window as the window 82 shown in FIG. 12. Through this, the user can input manipulation contents.

As shown in FIG. 10, following the display of the manipulation screen (step S101), the equipment controller 14 determines whether or not there is input from the user (step S102). For example, the equipment controller 14 determines whether or not the user has touched the button 84 shown in FIG. 12.

When a determination is made that there is no input from the user (step S102: No), the equipment controller 14 repeats the process of step S102. Through this, the equipment controller 14 waits until there is a user input.

When a determination is made that there is input from the user (step S102: Yes), the equipment controller 14 controls the facility equipment 41-43 on the basis of the control information 60 (step S103). For example, the equipment controller 14 references the control information 60 and acquires the address of the manipulation target equipment. In addition, the equipment controller 14 generates a control command in accordance with the manipulation contents that were input. Then, the equipment controller 14 outputs to the equipment communicator 17 the address of the manipulation target equipment and the generated control command.

Following this, the control device 10 again executes the process of step S101.

As described above, the terminal 20 acquires setting-support information for setting the control information 60 in the control device 10 through analysis of the captured image, and transmits the acquired setting-support information to the control device 10. In addition, the control device 10 sets the control information 60 on the basis of the setting-support information transmitted from the terminal 20. Consequently, the worker can set the control information 60 in the control device 10, through capturing the image. Accordingly, easily setting the control information 60 in the control device 10 is possible.

Typically, the designer and the contractor that created the design materials 71, 72 differ from the worker that sets the control information 60. Among these designer, contractor and worker, the conventional custom has been to convey information by documents. With the control system 100 according to this exemplary embodiment, the control information 60 is set by capturing documents, so easily setting the control information 60 is possible without forcing a change of conventional customs on the designer, contractor and worker.

In addition, the analyzer 22 of the terminal 20 reads the two-dimensional code from the image and acquires as setting-support information the control information 60 included in the two-dimensional code that was read. Acquisition of the control information 60 from the two-dimensional code enables certain acquisition of the control information 60 with a smaller processing load imposed on the terminal 20, in comparison to acquisition of the control information 60 from the table 721 indicated in the design materials 72. Consequently, the possibility of erroneously setting the control information 60 can be reduced.

In addition, the analyzer 22 of the terminal 20 acquires as setting-support information the server identification information included in the two-dimensional code that was read. Then, the setter 12 of the control device 10 acquires the control information 60 from the server 30 on the basis of the server identification information. Because there is a limit to the size of data included in the two-dimensional code (for example, 3 kB), when the size of the control information 60 is large, creating a two-dimensional code including the control information 60 becomes difficult. On the other hand, because the server identification information is used only to simply identify the server 30, the data size thereof is in general small. Accordingly, control information 60 of large size can easily be set by storing the control information 60 in the server 30.

In addition, the analyzer 22 of the terminal 20 reads from the image the layout diagram in which the equipment identification information and the attribute information are associated with each other, and acquires as setting-support information the control information 60 in which the equipment identification information and the attribute information are associated with each other. Consequently, the worker U1 can set the control information 60 in the control device 10 by capturing the layout diagram showing the control information 60. Accordingly, the control information 60 can be easily set while eliminating the work of adding a two-dimensional code to conventional design materials. In addition, even when the position of the facility equipment 41-43 is not shown in the design materials 72, the control device 10 can understand the positions of the facility equipment 41-43 and easily create a manipulation screen using the layout diagram.

In addition, for equipment identification information, when one item of attribute information and another item of attribute information are set as the control information 60 by the setter 12, the display 15 of the control device 10 displays a manipulation screen associating the one item of attribute information and the other item of attribute information. Specifically, the display 15 displays the floor name (the one item of attribute information) and the label (the other item of attribute information) associated with each other, as shown in FIG. 11. Consequently, the display 15 can display the types of a plurality of pieces of facility equipment 41-43 in a hierarchized form, by using a plurality of items of attribute information. Accordingly, the user of the control device 10 can select and easily manipulate the appropriate equipment from the plurality of pieces of facility equipment 41-43.

In addition, the attribute information includes the locations of the facility equipment 41-43. Specifically, the labels (the room names) appended to the facility equipment 41-43 and the position information indicating the positions of the facility equipment 41-43 are included in the attribute information. The user generally identifies the facility equipment 41-43 using these locations of the facility equipment 41-43. Consequently, a manipulation screen using the locations of the facility equipment 41-43 follows the user's instincts, and the user can easily manipulate the facility equipment 41-43 using the manipulation screen.

In addition, the warner 18 of the control device 10 issues a warning when the addresses and the model names included in the control information 60 that was set and the addresses and the model names included in the equipment information 61 acquired through communication with the facility equipment 41-43 differ. Consequently, the worker can easily recognize that there is some kind of defect in the setting of the control information 60, without personally confirming the set control information 60 item by item.

The exemplary embodiment may be modified as described below.

Variation

In the above-described exemplary embodiment, an example was described in which the control device 10 acquires the control information 60 from the server 30 when the server identification information is included in the two-dimensional code. However, in this case, the terminal 20 may acquire the control information 60.

Figure 14:
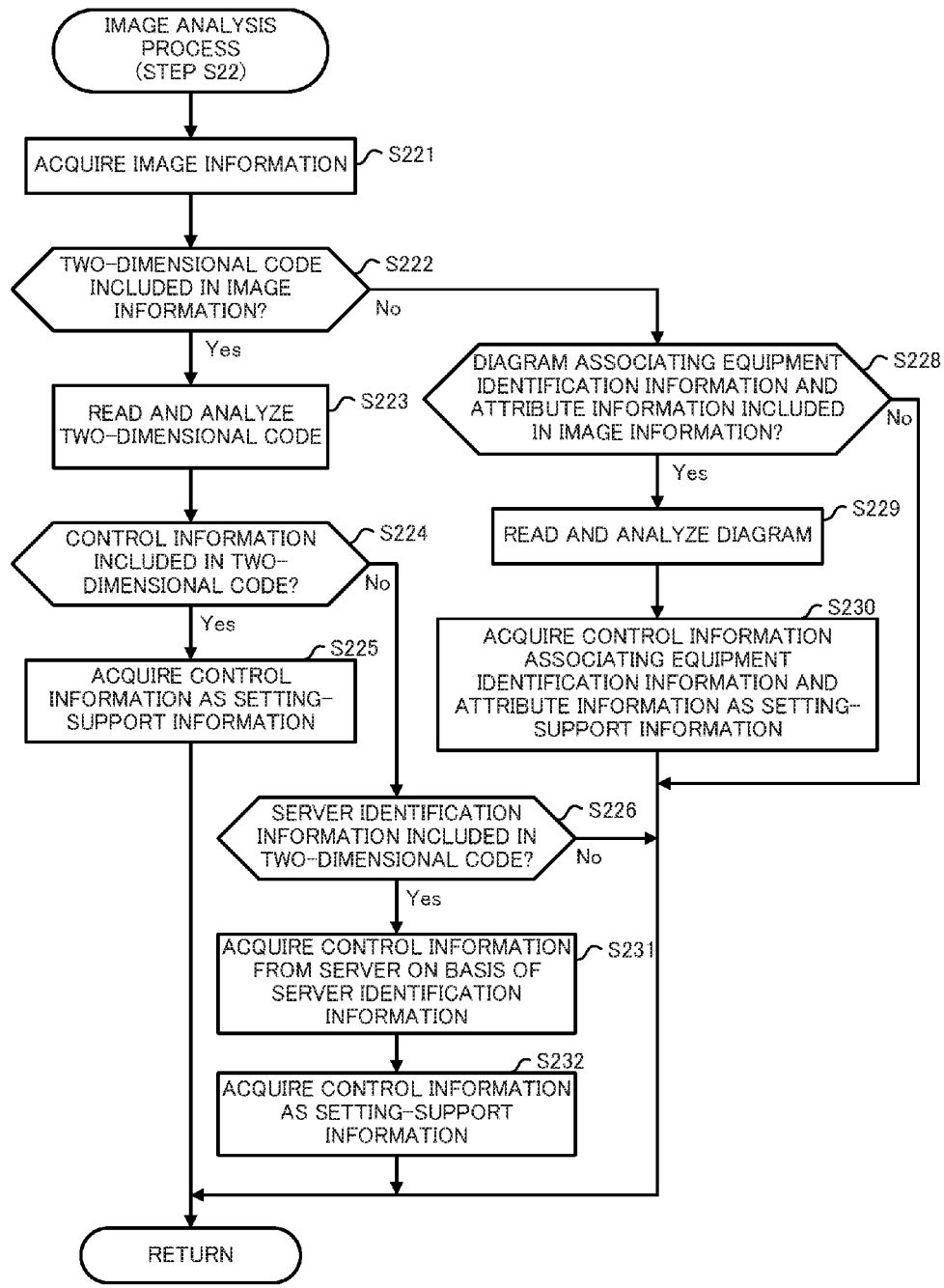
FIG. 14 is a flowchart showing one example of the flow of an image analysis process according to a variation.

FIG. 14 shows an image analysis process according to this variation. The processes of steps S221~S226 and S228~S230 in this image analysis process are executed the same as in the above-described exemplary embodiment. However, when a determination is made that the server identification information is included in the two-dimensional code (step S226: Yes), in this variation steps S231 and S232 are executed in place of step S227 according to the above-described exemplary embodiment (see FIG. 8).

Specifically, when a determination is made that the server identification information is included in the two-dimensional code (step S226: Yes), the analyzer 22 acquires the control information 60 from the server 30 on the basis of the server identification information (step S231).

The analyzer 22 acquires the control information 60 as the setting-support information (step S232). Following this, the analyzer 22 concludes the image analysis process.

As described above, with this variation, when the server identification information is included in the two-dimensional code, the terminal acquires the control information 60. Consequently, there is no need to connect the control device 10 to the network N1. Through this, easily setting the control information 60 in the control device 10 via the terminal 20 becomes possible the same as in the exemplary embodiment, even when an environment is not prepared in which the control device 10 is connected to the network N1 such as the Internet and/or the like.

The functions of the control device 10 and the terminal 20 according to the above-described exemplary embodiment can be realized by dedicated hardware, and also by a typical computer system.

For example, equipment executing the above-described processes can be configured by the programs P1 and P2 stored in the auxiliary memories 103 and 203 being stored and distributed on a computer-readable memory medium such as flexible disk, compact disk read-only memory (CD-ROM), digital versatile disk (DVD), magneto-optical disk (MO) and/or the like, and by installing those programs P1 and P2 on a computer.

In addition, the programs P1 and P2 may be stored on a disk device possessed by a server device on a communication network such as the Internet and/or the like, and for example may be overlaid on carrier waves and downloaded to a computer, and/or the like.

In addition, the above-described processes can be achieved through startup execution while transferring the programs P1 and P2 via the network N1 such as the Internet and/or the like.

Furthermore, the above-described processes can be achieved by executing all or a portion of the programs P1 and P2 on a server device, and having a computer execute the programs P1 and P2 while sending and receiving information related to those processes via a communication network.

When the above-described functions are realized through allocation by an operating system (OS) or through cooperation between applications and an OS, only the portion other than the OS may be stored and distributed on a medium, be downloaded to a computer, and/or the like.

In addition, the means for realizing the functions of the control device 10 and the terminal 20 may be realized not just through software, but entirely or partially through dedicated hardware (circuits, and/or the like). For example, if the setter 12, the warner 18 and the analyzer 22 are configured using field programmable gate arrays (FPGA), application specific integrated circuits (ASIC) and/or the like, power conservation in the control device 10 and the terminal 20 is possible.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is suitable for setting information in a control system for controlling facility equipment.

REFERENCE SIGNS LIST

100 Control system
10 Control device
11 Receiver
12 Setter
13 Memory
14 Equipment controller
15 Display
16 Manipulation receiver
17 Equipment communicator
18 Warner
101, 201 Processor
102, 202 Main memory
103, 203 Auxiliary memory
104, 204 Input device
105, 205 Output device
106, 206 Communicator
109, 209 Internal bus
20 Terminal
21 Image capturer
22 Analyzer
23 Transmitter
207 Camera
30 Server
40 Network
41-43 Facility equipment
60 Control information
61 Equipment information
71, 72 Design materials
81 Icon
82 Window
83 Region
84 Button
711 Layout diagram
712, 722 Two-dimensional code
713 Box
721 Table
M1 Mark
N1 Network
P1, P2 Program
U1 Worker

The invention claimed is:

1. A control system comprising:
a control device configured to control facility equipment based on pre-set control information, and to connect to a server storing the control information via a network; and
a terminal configured to communicate with the control device, wherein
the terminal comprises
an image capturer configured to capture an image,
an analyzer configured to read a two-dimensional code from the image captured by the image capturer, and to analyze the two-dimensional code to acquire server identification information for identifying the server as setting-support information for setting the control information in the control device, the server identification information being included in the two-dimensional code, and
a transmitter configured to transmit the setting-support information acquired by the analyzer to the control device, and
the control device comprises
a receiver configured to receive the setting-support information transmitted from the transmitter, and
a setter configured to acquire the control information from the server based on the server identification information received as the setting-support information by the receiver, and to set the control information.

2. The control system according to claim 1, wherein the control device further comprises:
an equipment communicator configured to communicate with the facility equipment; and
a warner configured to acquire, when the facility equipment is configured to retain equipment information corresponding to the control information to be set, the equipment information from the facility equipment via the equipment communicator, and to issue a warning when the control information to be set and the equipment information differ from each other.

3. The control system according to claim 1, wherein the transmitter is configured to transmit the setting-support information acquired by the analyzer Directly to the control device.

4. A terminal that communicates with a control device configured to control facility equipment based on pre-set control information and to connect to a server storing the control information via a network, the terminal comprising:
an image capturer configured to capture an image;
an analyzer configured to read a two-dimensional code from the image captured by the image capturer, and to analyze the two-dimensional code to acquire server identification information for identifying the server included in the two-dimensional code as setting-support information for setting the control information in the control device; and
a transmitter configured to transmit the setting-support information acquired by the analyzer to the control device.

5. An information setting method for setting control information in a control device configured to control facility equipment based on the control information that is pre-set and to connect to a server storing the control information via a network, comprising:
capturing an image;
reading a two-dimensional code from the image and analyzing the two-dimensional code to acquire server identification information for identifying the server included in the two-dimensional code as setting-support information for setting the control information in the control device; and
acquiring the control information from the server based on the server identification information acquired as the setting-support information and setting the control information.

6. A non-transitory computer-readable recording medium storing a program that causes a computer comprising (i) an image capturer configured to capture an image and (ii) a communicator configured to communicate with a control device that controls facility equipment based on pre-set control information and connects to a server storing the control information via a network, to:
capture an image;
read a two-dimensional code from the image and analyze the two-dimensional code to acquire server identification information for identifying the server included in the two-dimensional code as setting-support information for setting the control information in the control device; and
transmit the setting-support information to the control device.

* * * * *